Dec. 15, 1931. F. L. MAIN 1,836,676
SPLIT RIM
Filed June 16, 1926
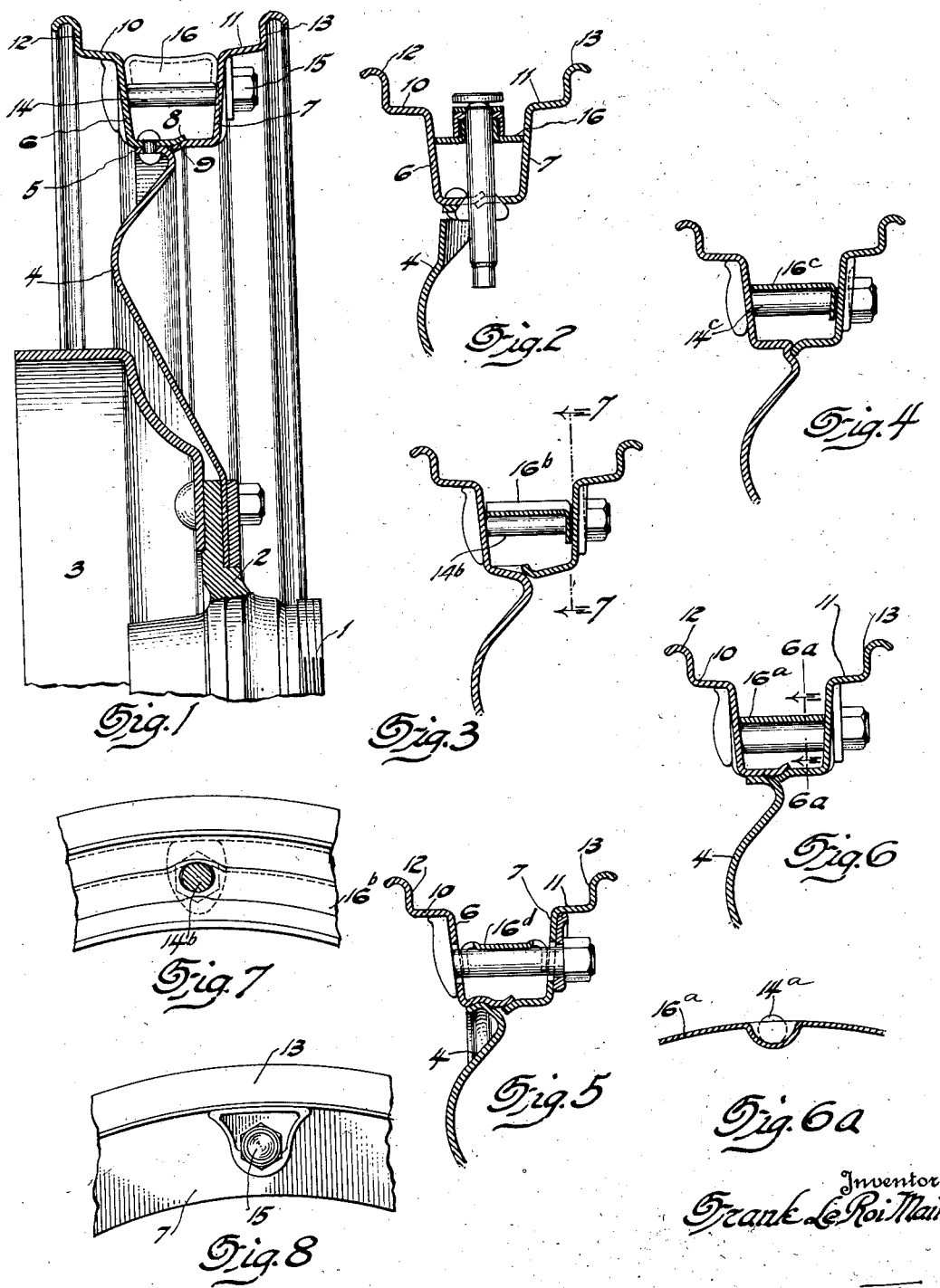

Patented Dec. 15, 1931

1,836,676

UNITED STATES PATENT OFFICE

FRANK L. MAIN, OF JACKSON, MICHIGAN, ASSIGNOR, BY MESNE ASSIGNMENTS, TO KELSEY-HAYES WHEEL CORPORATION, A CORPORATION OF NEW YORK

SPLIT RIM

Application filed June 16, 1926. Serial No. 116,363.

This invention relates to disc vehicle wheels of the pressed metal type, and more particularly to a rolled sheet metal split type of tire rim.

One of the primary objects of the invention is to provide a simple construction which will be extremely economical to manufacture, of light weight, yet of sufficient strength to withstand hard usage, and unlikely to get out of repair.

A further object of the invention is to provide a rim which can be readily "cold rolled" from light weight sheet metal, whereby the resulting light weight rim will afford a minimum amount of resistance to the propelling power.

A further object of the invention is to provide a rim upon which a tire may be readily and quickly mounted and demounted and one in which there will be no likelihood of pinching the inner air tube of the tire.

With the above primary and other incidental objects in view, as will more fully appear in the specification, the invention consists of the features of construction, the parts and combinations thereof, and their mode of assembly as hereinafter described and set forth in the claims.

In the drawings, wherein like parts are indicated by the same reference characters,—

Fig. 1 is a fragmentary sectional view of the assembled wheel and split rim forming the subject matter hereof;

Fig. 2 is a sectional view of the split rim showing the location of the air valve stem projecting through the rim;

Figs. 3, 4, 5 and 6 are sectional views of various modified forms of the rim;

Fig. 6ª is a section on line 6ª—6ª in Fig. 6;

Fig. 7 is a detail view taken on line 7—7 of Fig. 3; and

Fig. 8 is a detail side elevation of the tire rim at the location of the connecting bolt and lug.

Referring to the drawings, the numeral 1 indicates the conventional wheel hub having a peripheral flange 2, to which may be bolted the brake drum 3. The wheel is shown in the drawing as a pressed sheet metal disc 4 concaved for the purpose of rigidity, with its outer end terminating in a lateral flange 5.

While the disc type of wheel is to be preferred, the rim is not limited in its use to discs alone, but other forms of wheel may obviously be employed in conjunction with the present split rim.

The split rim forming the subject matter hereof preferably consists of two sections butted together at a substantially medial circumferential line. In the manufacture of these sections a flat piece of stock thin sheet metal is cut to length and its ends welded or otherwise integrally united to thereby form a continuous annular band. The band is then placed between suitable forming rolls and worked to the desired channel shape. After having been properly formed, the band is split on a medial circumferential line and the portion split adjacent of the one severed section is pressed outwardly, while the corresponding portion on the other section is pressed inwardly, thereby forming the abutment portions of the respective rim sections, as shown in the drawings.

The assembled rim thus formed is substantially that shown in Fig. 1, consisting of the two sections 6 and 7 with lateral base members terminating in the outwardly and inwardly disposed abutment portions 8 and 9 before mentioned. The radially outer edge portions of the sections 6 and 7 extend laterally in opposite directions as at 10 and 11 affording supports for the beads of the tire, while the radially outwardly extending flanges 12 and 13 retain the tire on the rim. A central peripheral channel is thus left between the two sections and the split joint of the rim occurs at the base of the channel and spaced quite a distance from the supported tire. The depth of the channel obviously may be varied depending on conditions, that shown in the drawing being merely for illustrative purposes.

The rim section 6 is fixedly attached to the lateral flange 5 of the disc in any suitable manner, as by riveting, bolting, welding, pressing, or otherwise, while the section 7 is detachably mounted to the section 6 by a series of bolts 14. By unthreading the nuts 15, the section 7 may thus be demounted to permit substitution of tires in a simple and easy manner, and on replacing the demounted rim section 7 it will readily fit into position with a minimum of effort.

In order to properly space the sections, there may be provided an annular spacer band 16 at the radially outer portion of the channel, which also closes the channel.

While in the past automobile wheels and their tire rims have been generally constructed of comparatively heavy material, such weight, in addition to being costly, possesses certain disadvantages which a lighter wheel effectively overcomes. The action of a heavy wheel is substantially that of a flywheel acting in opposition to the motor flywheel. Greater motor power is required to start the revolution of the traction wheels, and after the wheels have attained momentum, greater braking effort is required to lessen their speed. On rough roadways every bump the wheels contact with tends to check their momentum and place strains on the motor flywheel. The advantages of the light weight traction wheel in eliminating such flywheel action will, therefore, be apparent.

The provision of a deep channel for the split in the rim obviates any possibility of the inner air tube being caught in the split and "pinched." Pinching is quite common in that type of rim having a surface split, and results in weakening and tearing of the tube wall. The spacer member closing the channel also serves to prevent the tube contacting the split.

The spacer may be made in various shapes and placed at different radial distances in the channel. Thus in Fig. 6 it is merely a flat annular band 16ª at a radially midway point in the channel and passes around the bolts 14ª radially inside the same as shown more particularly in Fig. 6ª, while in Fig. 3 the spacer 16ᵇ is provided with a down-turned or radially inwardly extending flange at one side through which the bolts 14ᵇ pass to secure it in place, and the band has notches through which the bolts pass, also shown in Fig. 7. Again in Fig. 4 a simple form of the band 16ᶜ is illustrated, with a single down-turned or radially inwardly extending flange having holes for the passage of the bolts 14ᶜ, with the band in the plane of and resting on the bolt surface, and in Fig. 5 the band 16ᵈ has down-turned or radially inwardly extending flanges on both sides with notches for the bolts, the bolt holes in the rim sections being of greater diameter than the bolts for adjustment of the bolts in relation with the band.

Various forms of the attachment of the fixed rim section to the disc wheel are also shown, Fig. 1 illustrating a rivet connection, Fig. 6 a welded, brazed, soldered or pressed fit connection, and Fig. 5 shows a groove formed in the rim base and a corresponding bead on the disc flange fitting into the groove.

In some instances it might be found advisable to form the disc and one rim section integral or from one sheet of material as is shown in Figs. 3 and 4, both views showing different types of abutments for the demountable rim section, the particular form being nonessential.

It will be apparent that there is thus provided a device of the character described possessing the particular features of advantage enumerated, but which obviously is susceptible of modification in its form and arrangement of parts without departing from the principle involved.

While the structural features have been described more or less specifically, it is to be understood the invention is not limited to the exact details, but obvious modifications may be employed without departing from the spirit or scope of the invention as set forth in the appended claims.

Having described the invention, I claim:

1. A rolled sheet metal rim of the dropped center type including a pair of complementary sections of angular conformation in cross section, each sheet metal section having a radially projecting portion forming a side wall of the dropped center channel, a laterally and outwardly projecting portion at the periphery of said side wall to receive the bead of a tire and a laterally and inwardly projecting portion at the circumferential inner edge of said side wall to constitute a part of the base of said channel, the free edge portion of the last mentioned portion of one section being bent radially outwardly and the corresponding free edge portion of the other section being bent radially inwardly, said bent edge portions co-operating with each other to afford complemental abutments for the sections, and means for securing said sections together.

2. A rolled sheet metal rim of the dropped center type including a pair of complementary sections of angular conformation in cross section, each sheet metal section having a radially projecting portion forming a side wall of the dropped center channel, a laterally and outwardly projecting portion at the periphery of said side wall to receive the bead of a tire and a laterally and inwardly projecting portion at the circumferential inner edge of said wall to constitute a part of the base of said channel, the free edge portion of the last mentioned portion of one section being bent radially outwardly and the corresponding free edge portion of the other section being bent radially inwardly, said bent edge portions co-operating with each other to afford complemental abutments for the sections, a series of fastening bolts extending through the side walls and across the channel, and a spacer ring between said side walls closing the channel.

In testimony whereof I affix my signature.

FRANK L. MAIN.